United States Patent
Lorente et al.

(10) Patent No.: US 11,585,468 B2
(45) Date of Patent: Feb. 21, 2023

(54) THERMOPLASTIC ELASTOMERIC BELLOW DUCT

(71) Applicant: MANN+HUMMEL GmbH, Ludwigsburg (DE)

(72) Inventors: Sonia Lorente, Saragossa (ES); Jaime Gracia Heras, Saragossa (ES); Leopoldo Marzal Lopez, Saragossa (ES); Samuel Palau Fumanal, Saragossa (ES)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/158,878

(22) Filed: Jan. 26, 2021

(65) Prior Publication Data

US 2021/0231238 A1   Jul. 29, 2021

(30) Foreign Application Priority Data

Jan. 29, 2020   (EP) ..................... 20380003

(51) Int. Cl.
  *F16L 11/00* (2006.01)
  *F16L 11/11* (2006.01)
  *F16L 11/12* (2006.01)

(52) U.S. Cl.
  CPC ............ *F16L 11/11* (2013.01); *F16L 11/121* (2013.01)

(58) Field of Classification Search
  CPC ............................... F16L 11/11; F16L 11/121
  USPC ...................................... 138/121, 122, 109
  See application file for complete search history.

(56) References Cited

U.S. PATENT DOCUMENTS

| | | | | |
|---|---|---|---|---|
| 5,443,098 A | * | 8/1995 | Kertesz | B29C 66/73921 285/414 |
| 5,499,660 A | * | 3/1996 | StorgArd | F16L 55/1657 264/269 |
| 5,575,509 A | * | 11/1996 | Wood | F16L 11/11 285/280 |
| 5,682,924 A | * | 11/1997 | Powell | F24F 13/0209 138/155 |
| 5,810,054 A | * | 9/1998 | Goulet | F16L 37/02 72/370.07 |
| 5,848,812 A | * | 12/1998 | Morgan | F16L 27/12 285/181 |
| 6,041,824 A | * | 3/2000 | Powell | F24F 13/0209 138/155 |
| 6,135,158 A | | 10/2000 | Kraus | |
| 7,879,178 B2 | * | 2/2011 | Feichtenschlager | B29C 45/006 156/304.6 |
| 9,623,594 B2 | * | 4/2017 | French | B29C 45/14336 |
| 10,947,938 B2 | * | 3/2021 | French | F02M 35/10354 |

(Continued)

*Primary Examiner* — James F Hook (57) ABSTRACT

The invention relates to a thermoplastic elastomeric bellow duct (10) having a corrugated duct segment (12) interposed between two elbowed segments (14, 18), wherein at least one of the elbowed segments (18) is made of thermoplastic elastomeric and connected to an end section (22) of the corrugated duct segment (12) by overmolding the elbowed segment (18) over the end section (22) of the corrugated duct segment (12), and wherein the end section (22) of the corrugated duct segment (12) includes a guiding and sealing arrangement (50) pointing away from the corrugated duct segment (12) in a radial direction (32). The invention further relates to an air duct (80) having such a thermoplastic elastomeric bellow duct (10).

11 Claims, 8 Drawing Sheets

(56) References Cited

U.S. PATENT DOCUMENTS

2006/0279084 A1   12/2006  Collins
2007/0051417 A1*   3/2007  Boettner ................. F16L 11/15
                                                            138/109
2008/0308170 A1*  12/2008  Bock ....................... F16L 27/11
                                                            138/109

* cited by examiner

THERMOPLASTIC ELASTOMERIC BELLOW DUCT

TECHNICAL FIELD

The invention relates to a thermoplastic elastomeric bellow duct, in particular for an air duct for a combustion engine.

BACKGROUND

US2006125149A discloses a method for forming a duct used as, e.g., an air duct for an automobile engine, and provided with a corrugated section as an undercut part in a part of the longitudinal direction of the duct. The method comprises injecting an elastomer material into a cavity formed with a cavity die for forming an external surface of the duct, and a core die for forming an internal surface of the duct, where in the core die is a splittable core die which is axially splittable into two parts, one is a core die for forming a duct area containing the corrugated section, and the other is a core die for forming a duct area free from the corrugated section, and removing the duct area containing the corrugated section from the core die with expanding the corrugated section in the radius direction by air injection after opening the cavity die.

Nevertheless there are some limitations about which geometries can be produced with this process.

SUMMARY OF THE INVENTION

It is an object of the invention to provide a thermoplastic elastomeric bellow duct comprising a corrugated duct segment interposed between two elbowed segments which can be manufactured from two injection molded parts.

Another object of the invention is to provide an air duct which can be manufactured from two injection molded parts.

One object of the invention is achieved by a thermoplastic elastomeric bellow duct comprising a corrugated duct segment interposed between two elbowed segments, wherein at least one of the elbowed segments is made of thermoplastic elastomeric and connected to an end section of the corrugated duct segment by overmolding the elbowed segment over the end section of the corrugated duct segment, and wherein the end section of the corrugated duct segment comprises a guiding and sealing arrangement pointing away from the corrugated duct segment in a radial direction.

Another object of the invention is achieved by an air duct comprising a thermoplastic elastomeric bellow duct comprising a corrugated duct segment interposed between two elbowed segments, wherein at least one of the elbowed segments is made of thermoplastic elastomeric and connected to an end section of the corrugated duct segment by overmolding the elbowed segment over the end section of the corrugated duct segment, and wherein the end section of the corrugated duct segment comprises a guiding and sealing arrangement pointing away from the corrugated duct segment in a radial direction.

The other claims, the description and the drawings describe advantageous embodiments of the invention.

According to a first aspect of the invention, a thermoplastic elastomeric bellow duct comprising a corrugated duct segment interposed between two elbowed segments, wherein at least one of the elbowed segments is made of thermoplastic elastomeric and connected to an end section of the corrugated duct segment by overmolding the elbowed segment over the end section of the corrugated duct segment, and wherein the end section of the corrugated duct segment comprises a guiding and sealing arrangement pointing away from the corrugated duct segment in a radial direction.

The guiding and sealing arrangement provides the function of ensuring the position of the corrugated duct segment in the mold and the seal against leakage in the overmolding phase. Otherwise, the corrugated duct segment may have an uncertain position in the mold due to the corrugated duct segment's elasticity.

Preferably, a thermoplastic elastomeric (TPE) elbow duct segment is overmolded over a thermoplastic elastomeric bellow duct segment, produced by injection process and force demolded. Preferably, materials with shore Hardness from 70 to 90 Shore A are used.

The overmolded connection between corrugated duct segment and elbowed segment provides excellent strength properties and even severe flexibility demands on decoupling ability can be fulfilled without damages on the duct.

The corrugated duct segment may be manufactured by injection molding in a mold tool and demolded, e.g., force demolded, in a usual manner. Advantageously, connecting the elbowed segment by overmolding allows for a variety of geometries and bend angles between the corrugated duct segment and the elbowed segment.

Advantageously, demolding of the overmolded elbowed segment can be achieved without special tools such as pressurized air injection. The manufacturing can be conducted using one injection mold or two molds.

The guiding and sealing arrangement may provide guiding and sealing functionalities with one feature or two or more features on the corrugated duct segment. The feature as seal function is favorably provided continuously all around the corrugated duct segment. The feature as guide function preferably may have at least a face which can guide the slider into its correct position. In particular, the feature may have a surface inclined to allow external sliders guide the part to the correct position. At the same time, the corrugated duct segment is positioned in a stable position. The feature may be provided continuously all around the corrugated duct segment or be divided in several sections or only in one small section.

The corrugated duct segment may be manufactured already with a first elbowed segment in the injection mold in one piece. Optionally, the bellow duct may be manufactured with elbowed segments attached on both end sections of the corrugated duct segment by overmolding.

According to an advantageous embodiment of the bellow duct, the guiding and sealing arrangement may comprise at least one continuous rib protruding in radial direction from on an outer surface of the end section. The continuous rib allows for a secure seal despite high pressures during injection molding. The sides of the rib may provide the intended functions with a guide function on one side of the rib and a seal function on the opposing side of the rib.

According to an advantageous embodiment of the bellow duct, the continuous rib has a conical cross section. Each side of the rib may be optimized for the intended functions with a guide function on one side of the rib and a seal function on the opposing side of the rib. Favorably, the side provided for sealing may be inclined in an angle range of at least 5° and not more than 45°. Likewise, the side provided for guiding may be inclined in an angle range of at least 5° and not more than 45°. Advantageously, the seal side may intersect the outer surface of the end section at a steeper angle than the guide side.

According to an advantageous embodiment of the bellow duct, the continuous rib may comprise a seal side and an opposing guide side, in particular wherein the seal side intersects the wall at a steeper angle than the guide side. In particular, the seal side of the rib may be arranged closer to the end section than the opposing guide side. The sealing function can be secured by a slider in the mold having an appropriate recess when material is introduced by injection during molding.

In particular, the seal side of the rib may be arranged closer to the end section than the opposing guide side. Favorably, the seal side may be pointing towards the elbowed segment with the guide side being the opposing side of the rib. In an advantageous embodiment, the seal side of the rib may be arranged perpendicular or close to perpendicular with a small angle below 10° to the outer surface of the end section.

According to an advantageous alternative embodiment of the bellow duct, the guiding and sealing arrangement may comprise a first rib structure configured for guiding an injection tool when closing the tool around the end section of the corrugated duct segment and a second rib structure configured for sealing the injection tool against a pressure during overmolding over the end section of the corrugated duct segment. Favorably, the sealing rib structure can be optimized for sealing functionality independent from the guiding functionality and vice versa.

According to an advantageous embodiment of the bellow duct, the guiding structure and the sealing rib structure may be configured as continuous ribs on the outer surface of the end section. The arrangement has a simple and reproducible geometry.

According to an advantageous embodiment of the bellow duct, the sealing rib structure may be configured as a continuous rib and the guiding rib structure may be configured as a discontinuous rib array on the outer surface of the end section. A skilled person can select from different arrangements according to desired layouts.

According to an advantageous embodiment of the bellow duct, the guiding rib structure and the sealing rib structure may be arranged symmetrically to each other with respect to the inclination of the particular rib surfaces. The arrangement has a simple and reproducible geometry.

According to an advantageous embodiment of the bellow duct, the guiding and sealing arrangement may protrude from the outer surface of the wall of the end section by at least ¼, in particular at least ⅓, of the wall thickness at an intersection of the guiding and sealing arrangement and the wall at a far side from the front face. In particular, the rib or rib array arranged distal from the end section may protrude by at least ¼, in particular at least ⅓, of the wall thickness at the intersection between the end section and the side of the rib or rib array opposite to the end section.

According to an advantageous embodiment of the bellow duct, the sealing rib structure may be arranged closer to the end section than the guiding rib structure. The arrangement is advantageous for sealing in a mold.

According to another aspect of the invention bellow duct, an air duct is proposed comprising a thermoplastic elastomeric bellow duct comprising a corrugated duct segment interposed between two elbowed segments, wherein at least one of the elbowed segments is made of thermoplastic elastomeric and connected to an end section of the corrugated duct segment by overmolding the elbowed segment over the end section of the corrugated duct segment, and wherein the end section of the corrugated duct segment comprises a guiding and sealing arrangement pointing away from the corrugated duct segment in a radial direction.

Advantageously, a reliable and cost efficient solution can be provided for flexible bellow ducts. Nevertheless, the air duct can provide sufficient strength and flexibility of the material. The overmolded connection between corrugated duct segment and elbowed segment provides excellent strength properties and even severe flexibility demands on decoupling ability can be fulfilled without damages on the duct.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION OF THE DRAWINGS

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
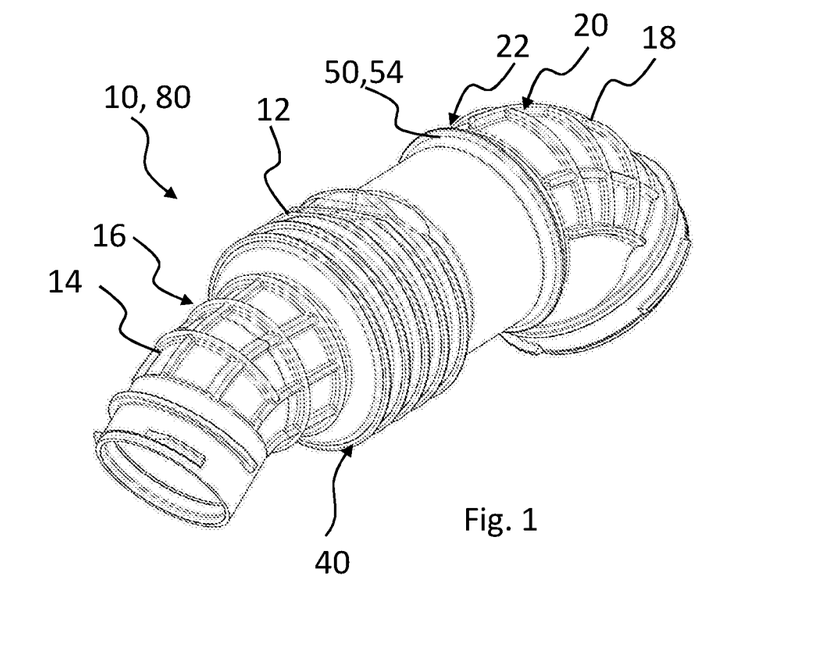
FIG. 1 a perspective view of an air duct, comprising a corrugated duct segment arranged between two elbowed segments according to an embodiment of the invention.

FIG. 1 depicts in a perspective view an air duct 80 comprising a thermoplastic elastomeric bellow duct 10. The thermoplastic elastomeric bellow duct 10 comprises a corrugated duct segment 12 interposed between two elbowed segments 14, 18. The corrugated duct segment 12 and the first elbowed segment 14 are, in this embodiment, made in one piece and form a base duct body 40.

The air duct 80 may comprise one or more additional ducts (not shown) attached to the duct body 40. The base duct body 40 is shown in isolation in FIG. 2.

Figure 2:
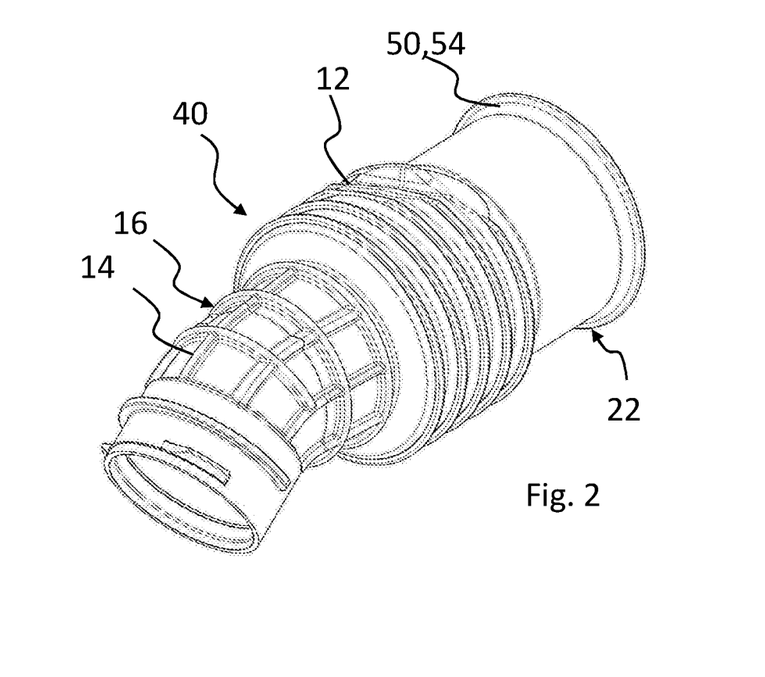
FIG. 2 a perspective view of the corrugated duct segment according to FIG. 1 with one elbowed duct and an end section for overmolding a second elbowed segment.

The corrugated duct segment 12 has a corrugated portion with the first elbowed segment 14 at one end. The first elbowed segment 14 has a bend region 16 juxtaposed to the corrugated portion of the corrugated duct segment 12.

At the opposing side of the corrugated portion of corrugated duct segment 12 a straight duct portion is arranged having an end section 22 to which the second elbowed portion 18 is attached by overmolding. The second elbowed segment 18 has a bend region 20 juxtaposed to the end section 22 at the straight portion of the corrugated duct segment 12. In another embodiment, the corrugated duct does not end straight but an end with another shape, e.g. with a bended section.

The end section 22 is provided with a guiding and sealing arrangement 50 formed as a single external rib 54 extending continuously along the circumference of the end section 22.

Preferably, all segments of the bellow duct 10 are made of thermoplastic elastomeric material, such as, for example, a polyamide-series elastomer, a polyester-series elastomer, a polyurethane-series elastomer (for example, a polyester-urethane elastomer, and a polyether-urethane elastomer), a polystyrenic elastomer, a polyolefinic elastomer (e.g., an elastomer comprising a polyethylene or polypropylene as a hard segment and an ethylenepropylene rubber or an ethylene-propylene-diene rubber as a soft segment; an olefinic elastomer comprising a hard segment and a soft segment which are different in crystallinity), a polyvinyl chloride-series elastomer, a fluorine containing thermoplastic elastomer, and so on. These thermoplastic elastomers may be used singly or in combination.

Figure 3:
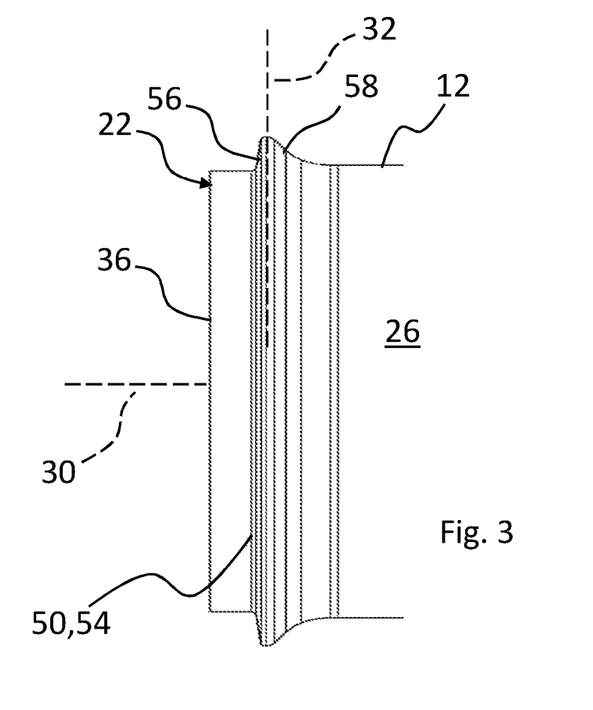
FIG. 3 in a side view a detail of a guiding and sealing arrangement positioned at an end section of a corrugated duct segment according to an embodiment of the invention where the guiding and sealing arrangement comprises one circumferential rib having guiding and sealing functionality.

FIG. 3 shows in a side view a detail of a guiding and sealing arrangement 50 positioned at an end section 22 of a corrugated duct segment 12 according to an embodiment of the invention where the guiding and sealing arrangement 50 comprises one continuous circumferential rib 54 providing guiding and sealing functionalities.

Figure 4:
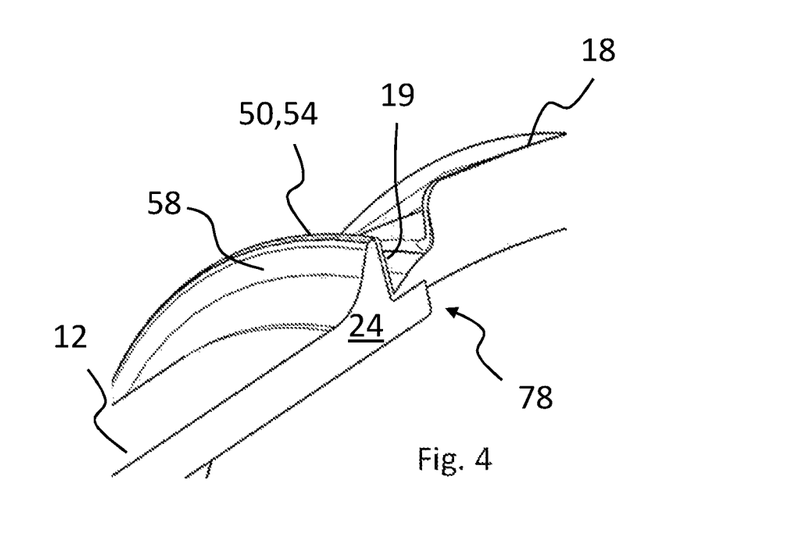
FIG. 4 in a cut view a detail of an interface between a corrugated duct segment according to FIG. 3 and an overmolded segment.

FIG. 4 shows in a cut view a detail of an interface 78 between the corrugated duct segment 12 according to FIG. 3 and the elbowed segment 18 overmolded over the end section 22 of the corrugated duct segment 12.

The guiding and sealing arrangement 50 comprises in this embodiment one continuous rib 54 protruding in radial direction 32 from on an outer surface 26 of the end section 22.

The continuous rib 54 has a conical cross section. The continuous rib 54 comprises a rib surface 56 has a seal side 56 and an opposing guide side 58, in particular wherein the seal side 56 intersects the wall at a steeper angle than the guide side, pointing towards the elbowed segment 18, the rib surface 56 being arranged perpendicular or close to perpendicular to an outer surface 26 of the end section 22.

The rib surface 56 of the rib 54 pointing towards the elbowed segment 18 is a seal side 56 of the rib 54 the opposite rib surface 58 is a guide side 58 of the rib 54. The guide side 58 allows to ensure the position of the corrugated duct segment 12 in a mold is correct prior to overmolding. The seal side 56 helps to avoid leakage in overmolding phase.

The elbowed segment 18 extends with a projection 19 of material on the seal side 56 of the rib 54.

Optionally, the front face 36 of the end section 22 may be provided with serrations or flaps or the like (not shown) extending in axial direction 30 to improve the connection between the end section 22 and the elbowed segment 18 at the interface 78.

Figure 5:
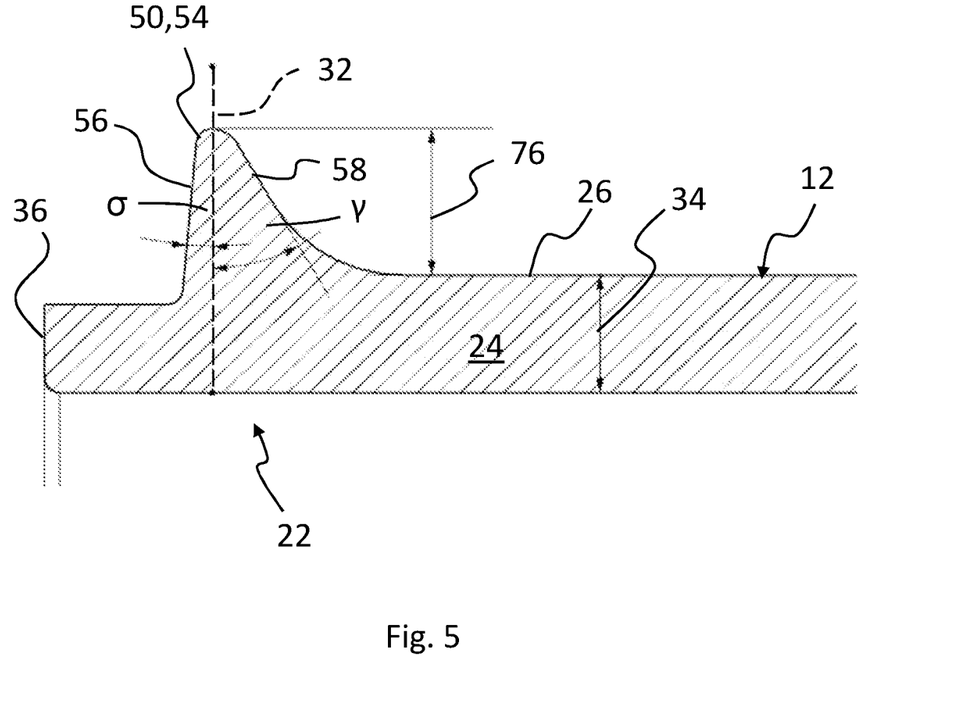
FIG. 5 in a longitudinal cut view a detail of a guiding and sealing arrangement composed of one rib according to an embodiment of the invention.

FIG. 5 shows in a longitudinal cut view a detail of a guiding and sealing arrangement 50 at an end section 22 of a corrugated duct segment 12, the guiding and sealing arrangement 50 being composed of one rib 54 according to an embodiment of the invention.

The rib 54 has a conical cross section with a seal side 56 inclined by an angle σ between the face of the seal side 56 and the radial direction 32 in an angle range of at least 5° and not more than 45°. The guide side 58 is inclined by an angle γ between the face of the guide side 58 and the radial direction 32 in an angle range of at least 5° and not more than 45°. In one embodiment, the angle σ may be much smaller than the angle γ.

The wall 24 of the end section 22 has a thickness 34 at the intersection of the rib 54, in particular the guide side 58 of the rib 54, and the outer surface 26 of the corrugated duct segment 12.

The height 76 of the rib 54 in radial direction 32 is at least ¼, preferably ⅓ of the thickness 34 of the wall 24

The wall 24 may be thinner at the opposite side 56 of the rib 54 as material from the overmolded elbowed segment 18 will add to the overall thickness at the interface 78

Figure 6:
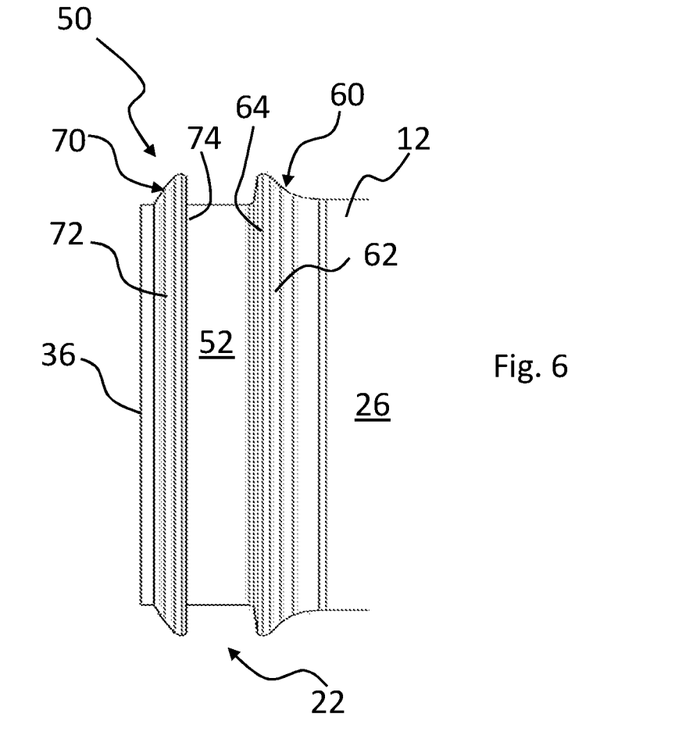
FIG. 6 in a side view a detail of a guiding and sealing arrangement positioned at an end section of a corrugated duct segment according to an embodiment of the invention where the guiding and sealing arrangement comprises two circumferential ribs with a sealing rib structure and a guiding rib structure.

FIG. 6 shows in a side view a detail of an alternative guiding and sealing arrangement 50 positioned at an end section 22 of a corrugated duct segment 12 according to a further embodiment of the invention where the guiding and sealing arrangement 50 comprises two circumferential ribs configured as a guiding rib structure 60 and a sealing rib structure 70.

Figure 7:
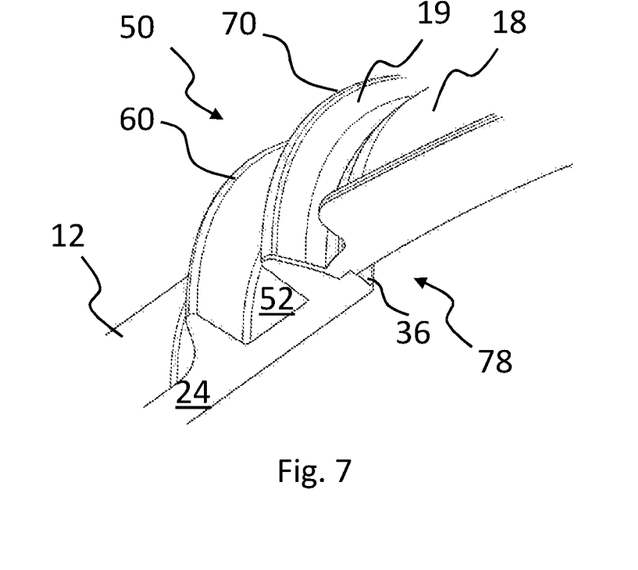
FIG. 7 in a cut view a detail of an interface between a corrugated duct segment according to FIG. 6 and an overmolded segment.

FIG. 7 shows in a cut view a detail of an interface 78 between the corrugated duct segment 12 according to FIG. 6 and an overmolded segment 18.

The guiding rib structure 60 is configured for guiding a slider of an injection mold when closing the slider around the end section 22 of the corrugated duct segment 12 so that the corrugated duct segment is positioned correctly in the mold. The sealing rib structure 70 is configured for sealing the injection tool against a pressure during overmolding over the end section 22 of the corrugated duct segment 12.

The sealing rib structure 70 and the guiding rib structure 60 are configured as continuous ribs on the outer surface 26 of the end section 22.

The sealing rib structure 70 is arranged closer to the front face 36 of the corrugated duct segment 12 than the guiding rib structure 60.

In this embodiment, the guiding rib structure 60 and the sealing rib structure 70 are arranged symmetrically to each other with respect to the inclination of the particular rib surfaces 72, 62 and 74, 64. The rib structures 60, 70 enclose a groove 52, where the wall 24 is thinner than at the far side of the guiding and sealing arrangement 50.

In an alternative embodiment (not shown), the sealing rib structure 70 may be configured as a continuous rib and the guiding rib structure 60 may be configured as a discontinuous rib array on the outer surface 26 of the end section 22.

The guiding rib structure 60 may be configured in an alternative embodiment with even only one projection instead of a plurality of ribs.

Figure 8:
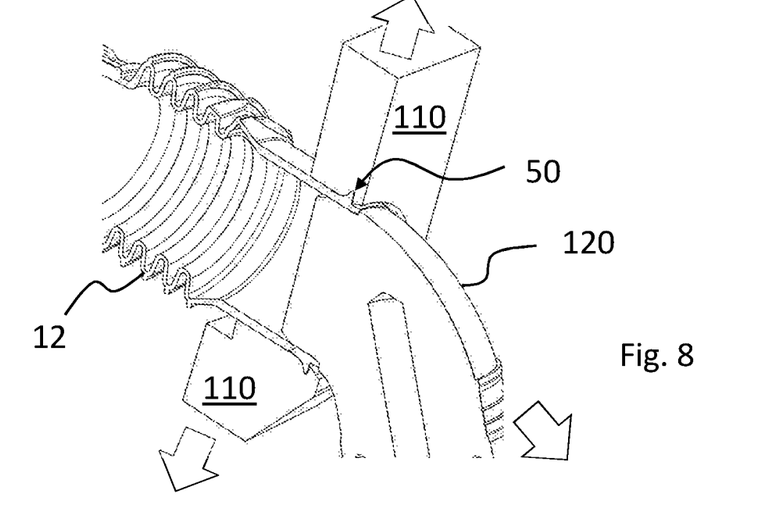
FIG. 8 in a perspective longitudinal cut view a detail of an interface at an end section of a corrugated duct segment partly enclosed by sliders of a mold with an elbowed core inserted in the corrugated duct segment at the end section.
Figure 9:
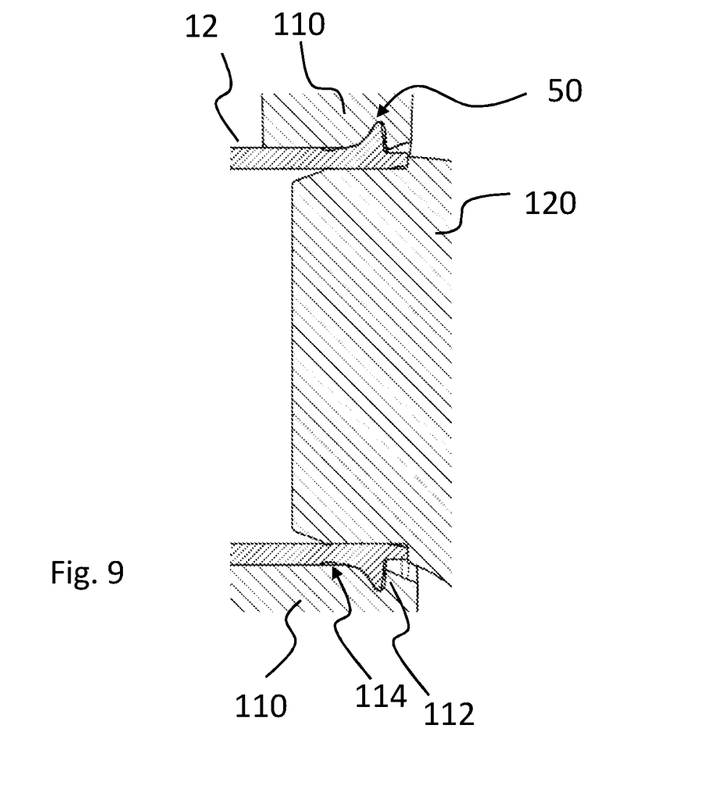
FIG. 9 in a longitudinal cut view the interfaces between sliders and core according to FIG. 8.
Figure 10:
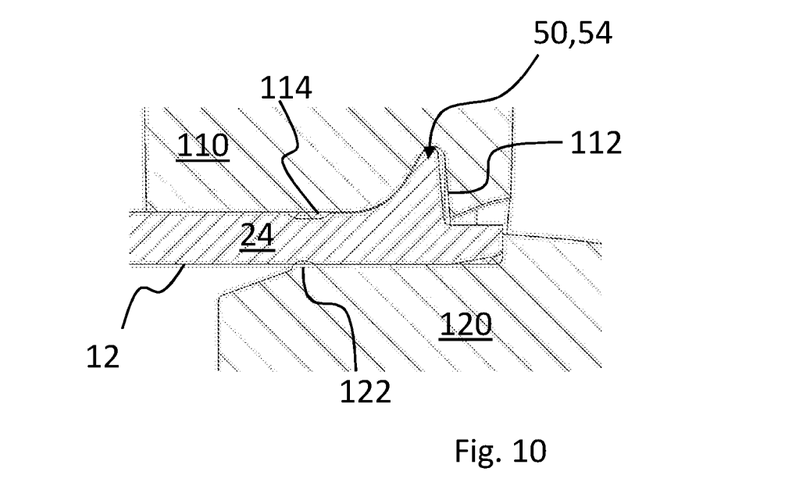
FIG. 10 in a longitudinal cut view the interfaces between sliders and core according to FIG. 8 indicating sealing ribs on sliders and core.

FIG. 8 depicts in a perspective longitudinal cut view a detail of an interface at an end section 22 of a corrugated duct segment 12 partly enclosed by a laterally splittable slider 110 of a mold with an elbowed core 120 inserted in the corrugated duct segment 12 at the end section 22. FIG. 9 shows in a longitudinal cut view the interfaces between the parts of the splittable slider 110, corrugated duct segment 12 and core 120 according to FIG. 8. FIG. 10 shows the interfaces in an enhanced view.

The bold arrows in FIG. 8 indicate the demolding directions of slider 110 and elbowed core 120.

As can be best seen in the enhanced view in FIG. 9, the splittable slider 110, a rib 114 protrudes from its surface to the corrugated duct segment 12. Likewise, a rib 122 protrudes from the surface of the elbowed core 120 to the corrugated duct segment 12. The rib 54 of the guiding and sealing arrangement 50 is caught in a recess 112 of the splittable slider 110.

The ribs 114, 122 compress the wall 24 of the corrugated duct segment 12 from both inside and outside for avoiding leaks and improving the closing of the mold.

It should be understood that such ribs can be arranged on the inner and/or outer surface of the corrugated duct segment 12 additionally or alternatively.

FIGS. 11 to 18 show different stages in an injection process of overmolding an elbowed segment 18 over a base duct body 40 comprising a corrugated duct segment 12 and an elbowed segment 14. Two molds 100, 130 are used in this embodiment.

Figure 11:
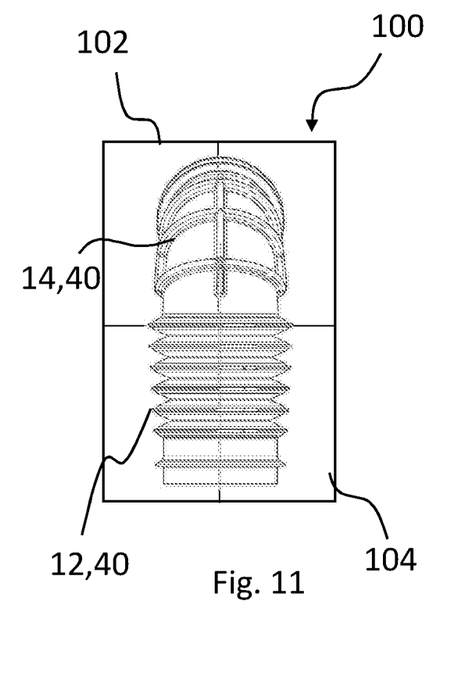
FIGS. 11-16 different stages in an injection process of overmolding an elbowed segment over a corrugated duct segment.

FIG. 11 shows a mold 100 with two splittable sliders 102, 104 for manufacturing the base duct body 40 with the corrugated portion of the corrugated duct segment 12 in slider 104 and the elbowed segment 14 in slider 102.

Figure 12:
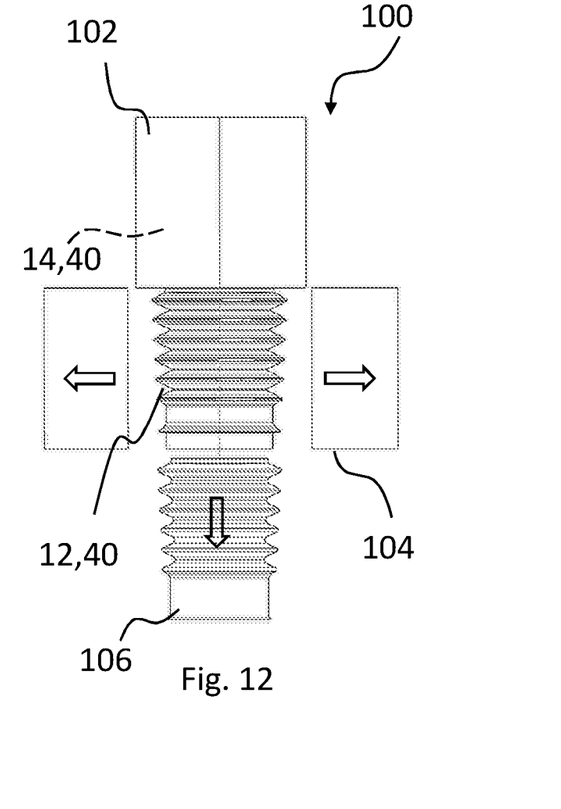
Figure 13:
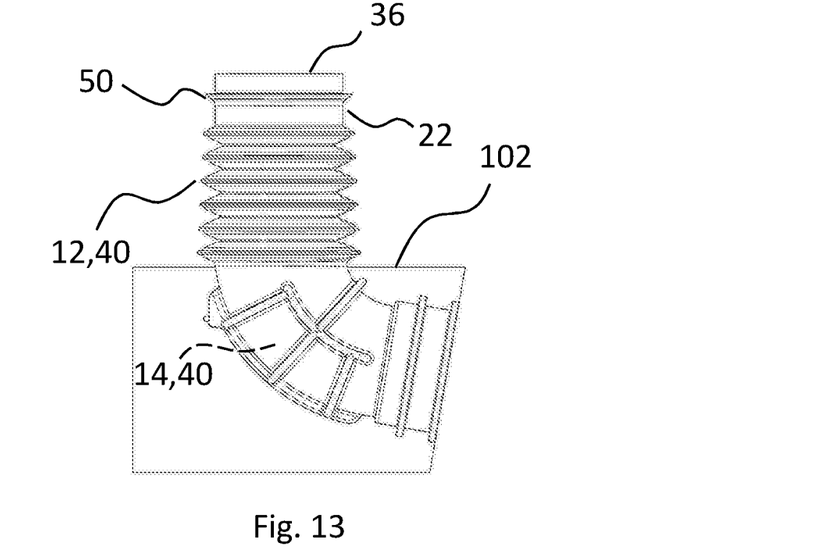

FIG. 12 shows demolding of the base duct body 40. The splittable slider 104 is removed from the corrugated portion of the corrugated duct segment 12 and the corrugated core 106 is force demolded from the corrugated duct segment 12. The elbowed segment 14 remains in the slider 102, as can be seen in FIG. 13.

At the end section 22 of the corrugated duct segment 12 a guiding and sealing arrangement 50 has been formed in conjunction with the base duct body 40.

Figure 14:
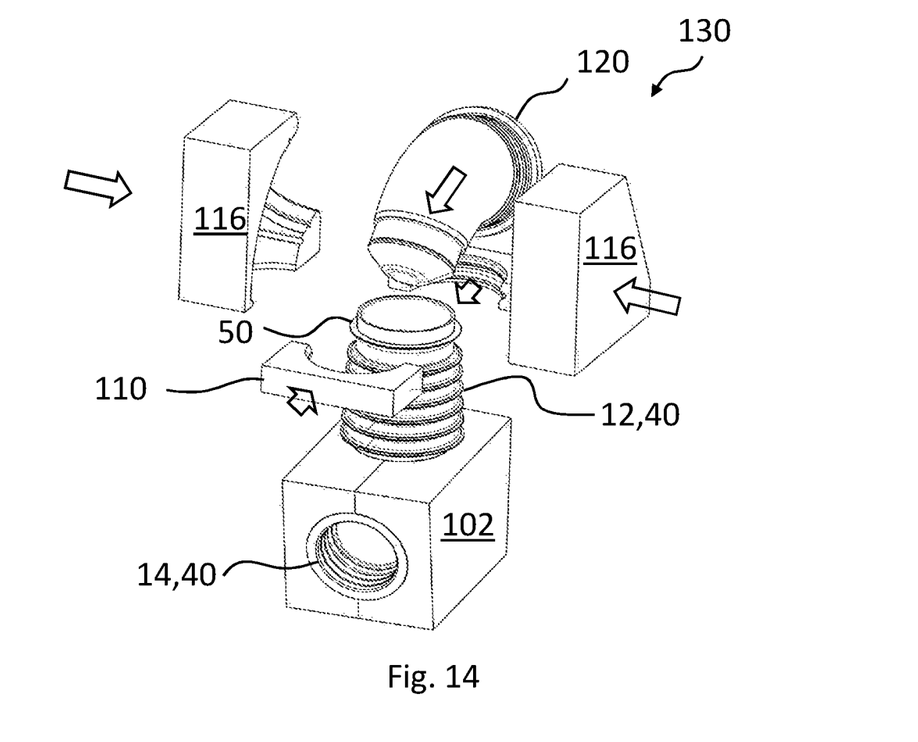

The end section 22 of the base duct body 40 is now accessible for a laterally splittable slider 110 which is arranged around the end section 22, as illustrated in an exploded view in FIG. 14.

An elbowed core 120 is inserted through the opening of the corrugated duct segment 12 at the end section 22 and a splittable slider 116 is closed. During this process, the corrugated portion of the corrugated duct segment 12 is slightly compressed since the corrugated bellow geometry is flexible and the final bellow shape is uncertain due to the force demolding process in mold 100 (FIG. 12).

The bold arrows in FIG. 14 indicate the closing direction of the sliders 110, 116 and core 120.

The slider 110 catch the guiding and sealing arrangement 50 and guides the corrugated duct segment 12 into a correct position and the splittable slider 110 can close properly. Likewise, the slider 110 provides a seal with the guiding and sealing arrangement 50 for avoiding leakage during molding.

When the slider 110 is closed, the slider 116 can close against the elbowed core 120.

Figure 15:
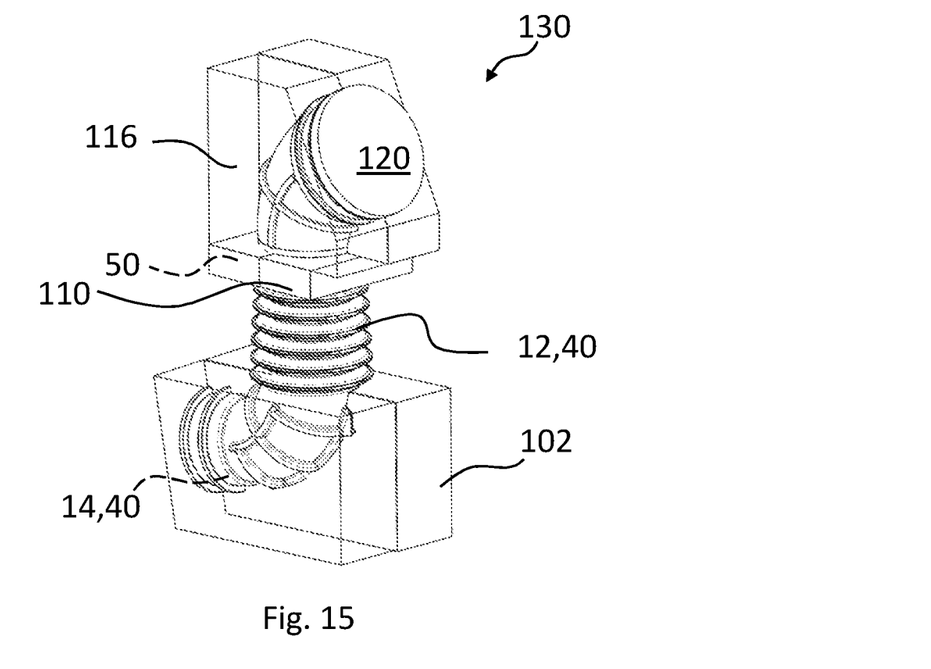

FIG. 15 shows the mold 130 in closed manner ready for the overmolding step.

Figure 16:
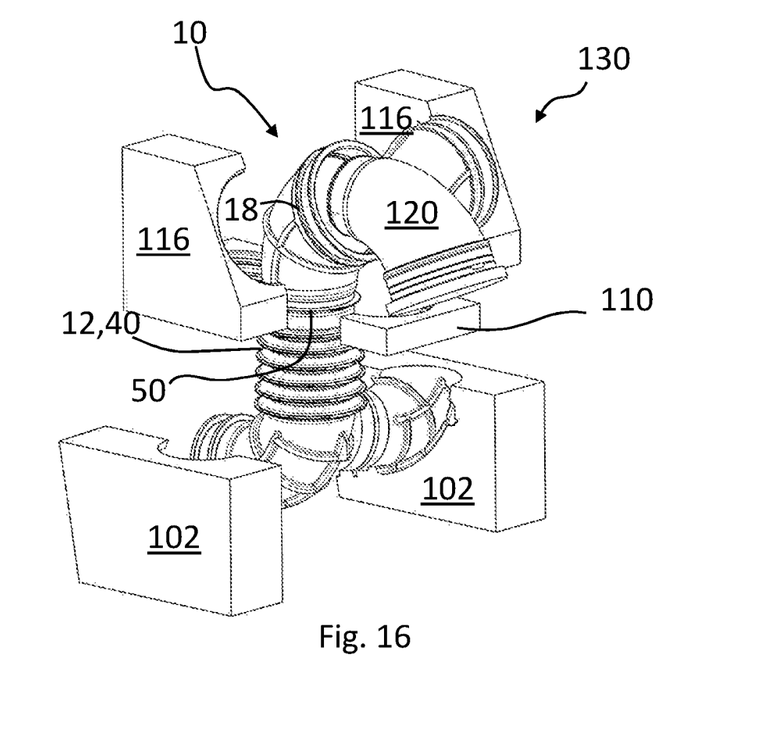

FIG. 16 illustrates the end of the overmold process in an exploded view of the mold 130 with the completed bellow duct 10 featuring the guiding and sealing arrangement 50 between the corrugated duct segment 12 and the overmolded elbow segment 18.

What is claimed is:

1. A thermoplastic elastomeric bellow duct comprising:
   a corrugated duct segment interposed between two elbowed segments,
   wherein at least one of the elbowed segments is made of thermoplastic elastomeric and is connected to an end section of the corrugated duct segment, the elbowed segment is fixedly overmolded onto and over the end section of the corrugated duct segment, and
   wherein the end section of the corrugated duct segment comprises
      a guiding and sealing arrangement pointing away from the corrugated duct segment in a radial direction and including a guiding structure and a sealing structure, the sealing structure intersecting an outer surface of a circumferential outer wall of the end section at a steeper angle than the guiding structure, and the sealing structure pointing toward the elbowed segment and the guiding structure pointing away from the elbowed segment.

2. The bellow duct according to claim 1, wherein the guiding and sealing arrangement comprises
   at least one continuous rib protruding in the radial direction from the outer surface of the end section.

3. The bellow duct according to claim 2, wherein the sealing structure comprises a seal side of the at least one continuous rib; and
   the guiding structure comprises an opposing guide side of the at least one continuous rib.

4. The bellow duct according to claim 3, wherein the seal side of the at least one continuous rib is arranged closer to the end section than the opposing guide side.

5. The bellow duct according to claim 1, wherein the at least one continuous rib has a conical cross section.

6. The bellow duct according to claim 1, wherein the guiding structure comprises a first rib structure configured as a guiding rib structure for guiding an injection tool when closing the tool around the end section of the corrugated duct segment; and
   the sealing structure comprises a second rib structure configured as a sealing rib structure for sealing the injection tool against a pressure during overmolding over the end section of the corrugated duct segment.

7. The bellow duct according to claim 6, wherein the guiding rib structure and the sealing rib structure form continuous ribs on the outer surface of the end section.

8. The bellow duct according to claim 6, wherein the sealing rib structure forms a continuous rib and the guiding rib structure forms a discontinuous rib array on the outer surface of the end section.

9. The bellow duct according to claim 6, wherein the guiding rib structure and the sealing rib structure are arranged symmetrically to each other with respect to an inclination of at least one outer rib surface of at least one continuous rib.

10. The bellow duct according to claim 6, wherein the sealing rib structure is arranged closer to the end section than the guiding rib structure.

11. The bellow duct according to claim 1, wherein the guiding and sealing arrangement protrudes from the outer surface of the circumferential outer wall of the end section by at least ¼ of a wall thickness at an intersection of the guiding and sealing arrangement and the circumferential outer wall at a side distal from a front face of the corrugated duct segment.

* * * * *